United States Patent [19]

Duverger

[11] Patent Number: 4,516,047
[45] Date of Patent: May 7, 1985

[54] ELECTRIC MOTOR WITH TWO DIRECTIONS OF ROTATION AND SHIFTABLE BRUSHES

[75] Inventor: Jean Duverger, Saint Pierre de Bressieuse, France

[73] Assignee: Black & Decker, Inc., Newark, Del.

[21] Appl. No.: 601,588

[22] Filed: Apr. 18, 1984

[30] Foreign Application Priority Data

Apr. 20, 1983 [FR] France ............................. 83 06460

[51] Int. Cl.³ ........................................... H02K 13/00
[52] U.S. Cl. ................................... 310/230; 310/240
[58] Field of Search ................. 310/177, 240, 230, 148

[56] References Cited

U.S. PATENT DOCUMENTS

| 297,867 | 4/1884 | Sperry | 310/230 |
|---|---|---|---|
| 432,561 | 7/1890 | Reckenzaun | 310/230 |
| 530,114 | 12/1894 | Moderegger | 310/230 |
| 2,472,018 | 5/1949 | Johnson | 310/250 |
| 2,475,276 | 7/1949 | Briggs | 310/240 |
| 2,764,705 | 9/1956 | Albertson et al. | |
| 3,440,465 | 4/1969 | Pratt et al. | |

FOREIGN PATENT DOCUMENTS

| 404642 | 10/1924 | Fed. Rep. of Germany | |
| 682924 | 10/1939 | Fed. Rep. of Germany | 310/230 |
| 2147790 | 1/1979 | Fed. Rep. of Germany | 310/230 |
| 8105109 | 6/1983 | Netherlands | |

Primary Examiner—Mark O. Budd
Attorney, Agent, or Firm—Edward D. Murphy; Harold Weinstein; Ronald B. Sherer

[57] ABSTRACT

A reversible electric motor has two pairs of brushes, a separate pair for each direction of rotation. The mean diametrical positions of the two pairs are fixed with respect to the motor's stator and angularly offset. The brushes of the one or the other pair, exclusively, are selected for application against the commutator as a function of the selected direction of rotation. Preferably a rotatable cam is arranged to lift the brushes of the non-selected pair from the commutator and insulating segments are inserted between the lifted brushes and the commutator. To simplify wiring, adjacent brushes, one from each pair, may be electrically connected together. Both pairs of brushes may advantageously be lifted from the commutator during motor reversal to eliminate risk of short-circuiting the commutator and also to interrupt supply of power thereto.

15 Claims, 11 Drawing Figures

FIG_1

FIG_10

FIG_11

4,516,047

ELECTRIC MOTOR WITH TWO DIRECTIONS OF ROTATION AND SHIFTABLE BRUSHES

The present invention relates to a reversible electric motor, and particularly relates to the brush arrangement for operating the motor in either direction of rotation.

BACKGROUND OF THE INVENTION

It is known that motors such as of the "universal" type or of the D.C. type are characterized by the ability of the rotor to rotate in one direction or in the other as a function of a choice in the mode of supplying the motor with electric current.

It is also known that the positioning of the brushes in contact with the commutator of the rotor for supplying the windings of the latter with electric current is important; indeed, it is known that it is preferable to place the brushes in line with an axial plane coinciding with the electric neutral of the field generated by the stator, and also that this plane is offset with respect to the axial plane corresponding to the mechanical neutral of the stator, respectively to one or other side thereof depending on the direction of rotation.

It has been proposed in U.S. Pat. Nos. 2,764,705 and 3,440,465 to make the pair of traditional brushes displaceable with respect to the stator between two limit positions corresponding to the respective positions of the electric neutral plane in opposite directions of rotation.

This solution makes it possible to optimize the positioning of the brushes as a function of the direction of rotation. However, it requires more complex electric circuitry for the brushes and the change in position of the brushes may be made only after they are electrically disconnected.

Further, the brushes wear differently depending upon the direction of rotation and upon whether the armature rotates more in one direction than the other. This also causes the brushes to operate under unfavorable mechanical conditions at the beginning of each phase of operation following a reversal in the direction of rotation.

SUMMARY OF THE INVENTION

It is an object of the present invention to provide an improved brush arrangement for a reversible electric motor.

A feature by which this object is attained, is the provision of two pairs of brushes, one for each direction of rotation, and an arrangement for lifting one pair of brushes from the commutator when the other pair of brushes is in use.

This provides several advantages. Electrical connection of the brushes is simplified. Both pairs of brushes can remain electrically connected so avoiding complications of disconnecting the pair of brushes that are not being used. Brush wear is always in the same direction of rotation of the commutator and related directly to the amount of use in the forward or reverse direction, respectively, for the particular pair of brushes. Since each pair of brushes is associated with one respective direction of rotation only, the pairs of brushes may be arranged symmetrically or asymmetrically with respect to the mechanical neutral plane to obtain the operating characteristics desired in either direction of rotation.

Accordingly, therefore, there is provided by the present invention an electric motor, comprising a stator, an armature having a commutator, the armature being rotatable relative to said stator about an axis, this relative rotation being in either direction and determining the direction of rotation of the motor, and means for selecting the direction of rotation of the motor. Two pairs of brushes are provided, one pair contacting the commutator in one direction of rotation of the motor, and the other pair being angularly displaced about said axis from said one pair and contacting the commutator in the opposite direction of rotation of the motor. Means is provided for moving said other pair of brushes out of contact with the commutator when said one direction of rotation is selected, and for moving said one pair of brushes out of contact with the commutator when said other direction of rotation is selected.

The selecting means may be mechanically connected to and operate the brush moving means.

Preferably the brush moving means comprises a cam rotatable about said axis and having two diametrically opposed lobes symmetrically disposed with respect to said axis. The brushes may have projections which are engageable by the cam for lifting the respective pairs of brushes off the commutator.

Preferably, each brush is slidably mounted in a separate brush box, and the brush boxes of one brush of each pair of brushes are mounted on and connected by a first member of electrically conductive material, and the brush boxes of the other brush of each pair are mounted on and connected by a second member of electrically conductive material spaced from and on the opposite side of said axis to said first member.

Means, connected to the brush moving means, may be provided for forming a barrier between either pair of brushes, when moved out of contact with the commutator, and the commutator. Preferably, the barrier forming means comprises two electrically insulating arcuate segments coaxial with said axis and on opposite sides thereof.

The cam may be configured to lift both pairs of brushes from the commutator when operated to change the direction of rotation of the motor. During this direction changing operation, the insulating arcuate segments may be inserted between both pairs of brushes and the commutator.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

The preferred embodiment of an electric motor according to the invention will first be described with reference to FIGS. 1 to 3.

The reference numeral 1 (see FIG. 2) designates the motor housing and this housing will serve as a reference when subsequently referring to the fixed state of certain elements of the motor. In known manner, the housing 1 supports therein a fixed stator 2 (see FIG. 3), of conventional type, and a pair of bearings 3 (only one of which is shown in FIG. 3) defining a fixed axis of rotation 4 with respect to the housing 1. Rotatably mounted at its ends in the bearings 3 is a shaft 5 carryng integrally a conventional rotor or armature 6 with a commutator 7. As is well known, the commutator 7 has a cylindrical outer peripheral face 8 rotatable around the axis 4, and defined by spaced apart but adjacent conductive segments 9 oriented parallel to the axis 4 and electrically insulated from one another.

Two conductive wires 10, 11 inside the housing 1 supply electric current to the commutator segments 9 via motor brushes which are selectively brought into contact with the face 8 of the commutator 7 depending on the direction in which it is desired that the armature 6 rotate. Two pairs of brushes are provided. The two brushes 12, 13 of a first pair are arranged along a common diametrical mean axis 14 intersecting the rotational axis 4 at right angles, with the brushes 12, 13 being disposed on either side of the axis 4. Likewise, the two brushes 15, 16 of the second pair are arranged along a common mean diametrical axis 17 intersecting the axis 4 at right angles at the same point as the axis 14. The brushes 12, 13, 15, 16 can be of any known type for example, in the form of rods of a conductive material such as graphite or a sintered metal and having, a constant rectangular cross-section. The two mean axes 14 and 17 of the brushes are fixed with respect to the housing 1 and angularly offset, with reference to the axis 4, with respect to a plane 18 including the axis 4 and corresponding to the mechanical neutral plane of the stator. The mean axis 14 of the brushes 12 and 13 is disposed in a plane including the axis 4 and corresponding to the electric neutral plane of the field generated by the stator 2 upon rotation of the armature 6 in the direction 19; and the mean axis 17 of the brushes 15 and 16 is disposed in a plane including the axis 4 and coinciding with the electrical neutral of the field generated by the stator 2 upon the rotation of the rotor 6 in the opposite direction 20.

It is known that, as a rule, the axial plane corresponding to the electric neutral, for a given direction of rotation of the rotor with respect to the stator, is disposed between approximately 10° and 40° upstream of the plane corresponding to the mechanical neutral in that direction of rotation. Good results are obtained by placing the mean axes 14 and 17 symmetrically on opposite sides of the plane 18, with an angular offset between these two mean axes of approximately 60° as shown in FIG. 2. That is, each mean axes 14, 17 makes an acute angle of 30° with the plane 18. Of course, other values can be used without departing from the scope of the invention.

The brushes 12, 13, 15, 16 are slidably mounted in brushes boxes 21, 22, 23, 24, respectively, for translatory motion along the respective mean axes 14, 17.

Figure 1:
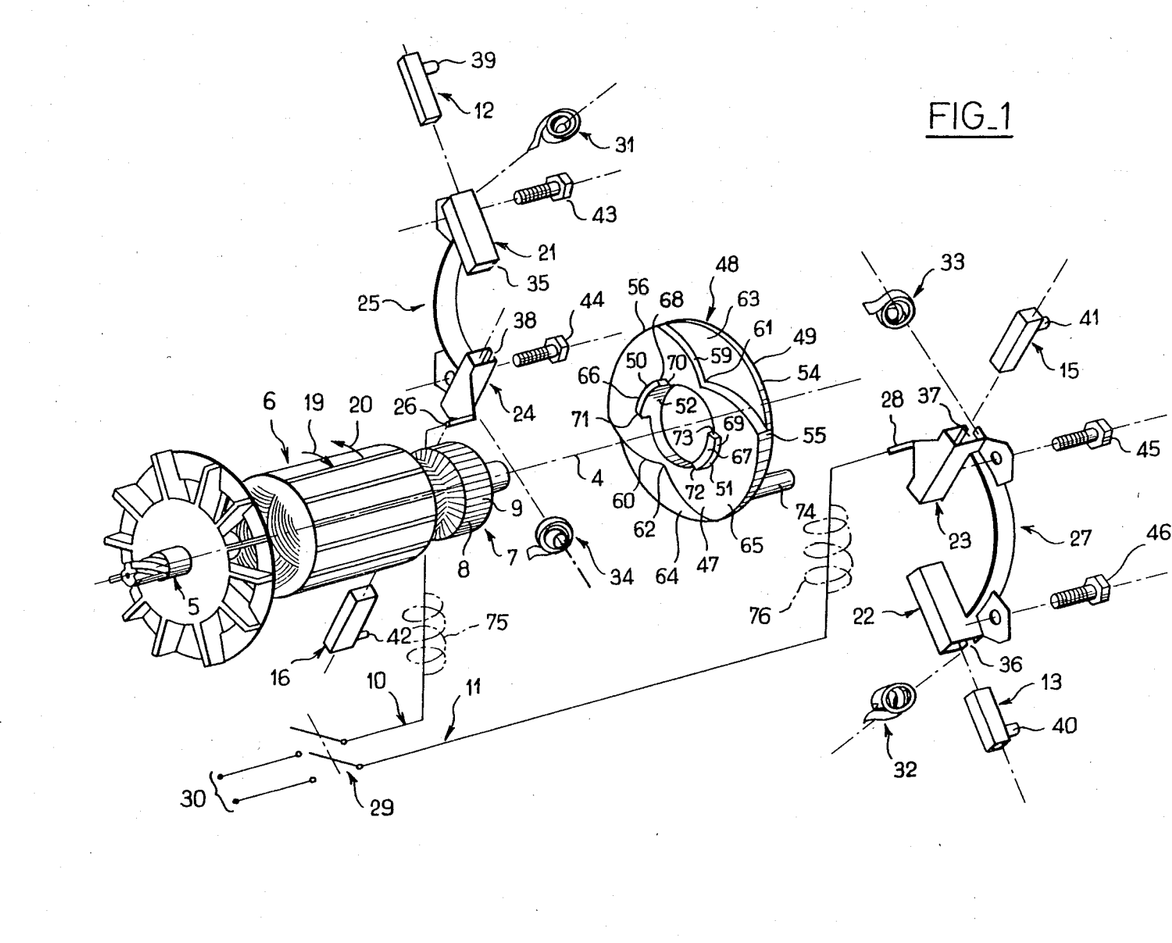
FIG. 1 shows an exploded view of the different elements of an electric motor according to the invention.

Preferably, as can be seen from FIG. 1, the brush boxes 21 and 24, corresponding to the two brushes 12 and 16 situated on one side of the plane 18, are made integrally with a common support 25 of an electrically conductive material, for example metal. This common support 25 is mounted on the housing 1 or stator 2 by screws 43 and 44, and is provided with a terminal 26 to which is connected the supply wire 10. Similarly, the brush boxes 22 and 23 are formed integrally with a second common support 27 of conductive metal, attached to the housing 1 or stator 2 by screws 45, 46 and having a terminal 28 to which is connected one end of the other supply wire 11. The two wires 10, 11 lead to a double pole electric switch 29 supported by the housing 1 and by which the wires 10, 11 are connected to a a source of electrical supply 30. In the case of an AC motor of the so-called "universal" type, field coil windings 75, 76 of the stator 2 are connected in series in the wires 10, 11 with the terminals 26, 28, respectively, as schematically illustrated by dash-dot lines in FIG. 1. Whereas in the case of a DC motor whose stator is constituted by a permanent magnet and is devoid of such windings, the terminals 26, 28 are connected directly to the switch 29, as can be seen in solid lines in FIG. 1.

It will be noted that as soon as the switch 29 is closed, all four brushes 12, 13, 15, 16 are simultaneously supplied with electricity via their corresponding brush boxes through contact with the latter.

The outer end of each brush box is provided with a coil spring, respectively 31, 32, 33, 34, of which one extremity is connected to the common support 25 or 27 and the other end bears radially inwardly on the outer end of the corresponding brush to resiliently bias the brush towards the surface 8 of the commutator 7.

Each of the brush boxes 21, 22, 23, 24 has, on its side facing away from the stator 2 along the direction of the axis 4, a respective slot 35, 36, 37, 38 (see FIG. 1) extending radially with respect to the axis 4 over the entire length of the brush box to allow for movement of a lug, respectively 39, 40, 41, 42, carried by and projecting from the corresponding brush, respectively 12, 13, 15, 16. These lugs 39, 40, 41, 42 project outside the respective brush box, through the slot of the latter, in a direction away from the stator 2 and parallel to the axis 4. The The lugs are a free sliding fit in these slots. The projecting portions of the lugs 39, 40, 41, 42 cooperate with a cam 47 rotatable about the axis 4 for lifting the brushes off or allowing them to be spring biased into electrical contact with the commutator 7.

The cam 47 is made of electrically insulating material, for example thermoplastic material, and is formed as an integral part of a cam member 48 of generally disc-like configuration. The cam member 48 comprises, apart from the cam 47, a support disc 49 and two electrically-insulating cylindrical segments 50, 51. The support discs 49 and the segments 50, 51 are juxtaposed to the cam 47 respectively on either side of the latter with reference to the central axis 4. The cam 47, flat in shape and oriented generally perpendicular to the axis 4, has its cam surface located for engagement with the projecting lugs 39, 40, 41, 42, whereas the support disc 49 is situated beyond the extremities of the lugs and does not interfere therewith. The arcuate segments 50, 51 are diametrically opposed on opposite sides of the commutator 7 adjacent the surface thereof and capable of being inserted between the brushes 12, 13, 15, 16 and the surface 8 of the commutator.

The cam member 48 has a central bore defined by a cylindrical internal peripheral face 52 which is common to the different components 47, 49, 50, 51 of the member 48. The diameter of the internal peripheral face 52 is slightly greater than the diameter of the commutator 7 so that the cam member 48 surrounds partially and coaxially the commutator face 8 in the areas of said internal peripheral face 52 corresponding to the segment 50, 51 without any contact with the commutator. Preferably, as illustrated in dash-dot lines in FIG. 3, the cam member 48 has a continuous annular disc 79 extending radially inwardly from the bore face 52 in line with the support disc 49. The disc 79, which is made of electrically insulating material, projecting radially inwardly to the immediate proximity of the shaft 5 in order to form an insulating wall between the commutator 7 and the bearing 3. This defines between the commutator segments 9 and the bearing 3, a baffle increasing the leakage impedance through the air between them, and thus making it possible to bring them close together along the axis 4 while maintaining the required degree of insulation.

The cam part 48 has on the side away from the stator 2 a flat face 53, and on the side towards the stator 2 the cam 47 has a flat face 65. The outer cylindrical peripheral surface 54 of the support disc portion 49 is provided with a rib 77 which is rotatably supported in a groove 78 formed in parts of the housing 1. Alternately, the outer peripheral surface 54 could be provided with a groove and an engaging circular rib provided on the inside of the housing 1, or other means may be provided for supporting the cam member 48 in the motor housing 1 for rotation about the central axis 4. The cam 47 is formed of two lobe portions, the outer cam surface, which is approximately the shape of a FIG. 8, having outer arcuate zones 55, 56 connected by transverse curved zones 60, 59 intersecting at 61, 62 to form "narrowings" of the cam contour, the points 61, 62 being located on a plane 58 which passes through the central axis 4 (see FIG. 2). The two lobes are symmetrical with respect to the plane 58, and therefore also with respect to the central axis 4, and each lobe, and therefore the cam 47, is symmetrical with respect to a plane 57 intersecting the plane 58 at right angles on the central axis 4. The outer cam zones 55, 56 are concentric with and form a continuation of the outer peripheral surface 54 of the support disc 49. Between this outer peripheray 54 and the transverse curved zones 59, 60 of the cam surface, the support disc 49 has two flat face portions 63, 64. The arcuate insulating segments 50, 51 projecting from the cam 47 are symmetrical with respect to the plane 58. As seen in FIG. 2, the arcuate segment 50 has an axial face 66 bounded by two end faces 70, 71; and the arcuate segment 51 has an axial fce 67 bounded by end faces 72, 73. The cylindrical segments 50, 51 have outer faces 68, 69, respectively, concentric with the axis 4.

The pair of brushes 12, 13 slide radially in their respective brush boxes 21, 22 along the electrical neutral plane 14, and the pair of brushes 15, 16 slide in their respective brush boxes 23, 24 radially along the outer electrical neutral plane 17. The mechanical neutral plane 18 bisects the angle between the two electrical neutral planes 14, 17, and in the position shown in FIG. 2 the plane 58 coincides with the electrical neutral plane 17 for rotation of the commutator 7 in the direction of the arrow 20. In this position, the outer cam zones 56, 55 are engaged under the projecting brush lugs 39, 40 so lifting the brushes 12, 13 off the commutator surface 8, and the insulating segments 50, 51 are interposed between the commutator surface 8 and the lifted brushes 12, 13. The projecting lugs 41, 42 of the other pair of brushes 15, 16 are in line with the narrowing points 61, 62 of the cam surface and are not in contact therewith so allowing the brushes 15, 16 to be resiliently urged by their springs 33, 34 into physical and electrical contact with the commutator surface 8.

The spacing, as well as the respective shapes and sizes of the cam zones 55, 56, 59 and 60 ca be defined as a function of the diameter of the commutator surface 8, the sizes of the brushes 12, 13, 15, 16, the position of the lugs 39, 40, 41, 42 extending from the brushes in relation to the respective mean axes 14, 17, and the angular offset between these axes. In FIG. 2, R designates the radius of the peripheral face 54 and so also the radius of the cam zones 55, 56, r designates the radius of the outer peripheral face 8 of the commutator 7, p the radial spacing of the respective narrowings 61, 62 of the cam contour from the central axis 4, and L designates the maximum useful length of any one of the brushes 12, 13, 15, 16 measured along the mean axis 14 or 17 of that brush, when the brush is new, between the inner end of the brush closest to the axis 4 and the point of the respective lug 39, 40, 41, 42 which is closest to the axis 4. The following distance relationships then apply:

$R > p > r$ $R - L > r$

Further, $\alpha$ designates the angular offset between the mean axes 14 and 17, measured as an acute angle including the plane 18, and $\beta$ designates the angular development of each of the outer cam zones 55, 56 about the axis 4. The angular relationships then exist:

$\beta > \alpha$ $\beta/2 > 90° - \alpha$

The transverse cam zones 59, 60 between the extremities of the zones 55, 56 and the narrowings or points 61, 62 can be defined as each being formed by a peripheral strip of a cylinder with a logarithmic base line whose generating lines are parallel to the axis 4, defined with reference to the latter by its polar radius of a minimal length p, its polar radius of maximal length R, and the angle $(90° - \beta/2)$ separating these two radii. This cylinder can be likened to a cylinder revolving around an axis parallel to the axis 4 and offset with respective to the latter.

Each arcuate insulating segment 50, 51 has a length such that its extremities at the end faces 70, 71 or 72, 73, respectively, subtend an angle at the central axis 4 approximately equal to $\alpha$ the angle between the electrical neutral planes 14, 17. The radial thickness e of the segments 50, 51 is such as to allow them to pass below the radially inner ends of the brush boxes when the cam member 48 is rotated about the axis 4. The segments 50, 51 not only function as an electrically insulating barrier between the raised brushes 12, 13 and the commutator 7, but also function to prevent these raised brushes moving inwardly into contact with the commutator should the projecting lugs 39, 40 become broken or otherwise fail to function. With respect to the released brushes 15, 16, as can be seen in FIG. 3, the projecting lug 42 does not contact the support disc 49 and is free to slide radially in the slot 38 under the action of the spring acting upon brush 16. It will be appreciated, therefore, that the brush 16 will continue to function as it wears until the projecting lug 42 has moved radially inwards and contacts the narrowing 62 of the contour of the cam 47. Thereafter, the brush 16 cannot move further towards the commutator 7, even if it wears further, so preventing the spring acting upon the brush 16 from contacting and shorting against the commutator 7.

An actuator 74 (see FIG. 1) formed integrally with the cam member 48 extends therefrom in a direction parallel to the axis 4 from the outer face 53 of the disc portion 49. The actuator 74 extends through a slot (not shown) in the motor housing 1 to enable the cam member 48 to be rotated about the axis 4 between two limit positions illustrated respectively in FIG. 2 and FIG. 9.

Figure 2:
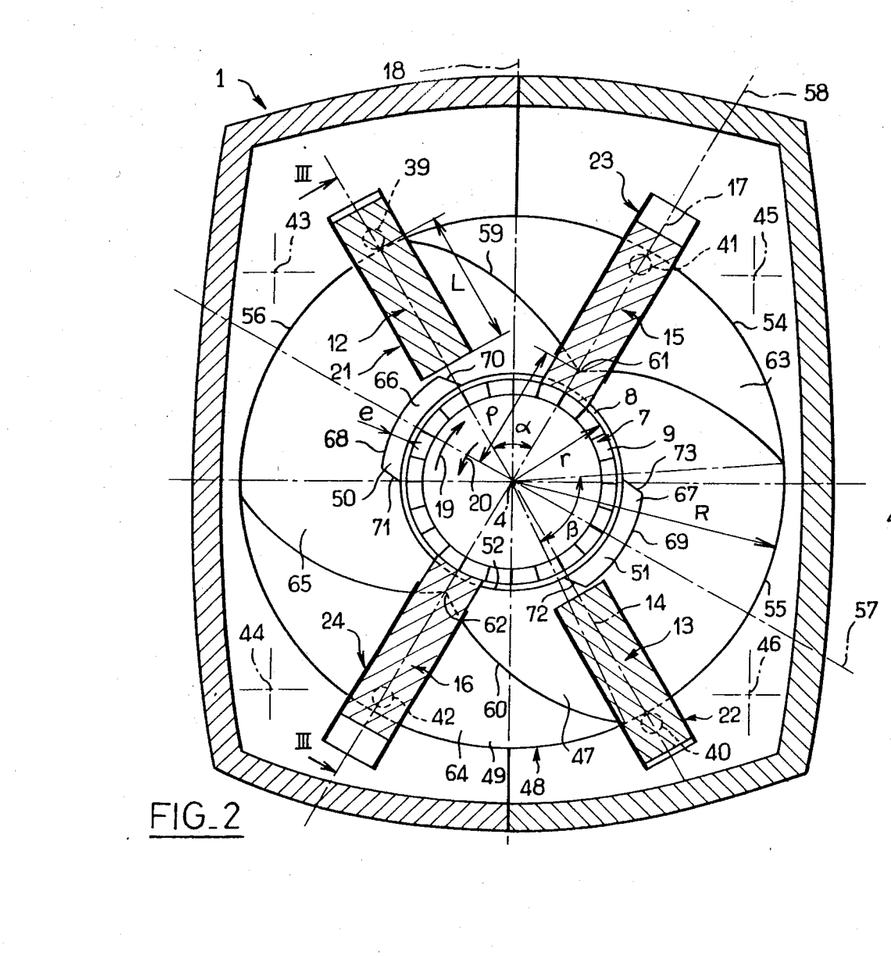
FIG. 2 is a section on the motor of FIG. 1 taken on the line II—II of FIG. 3 perpendicular to the axis of rotation of the armature with the brushes arranged for rotation of the armature in one of the directions of rotation.
Figure 3:
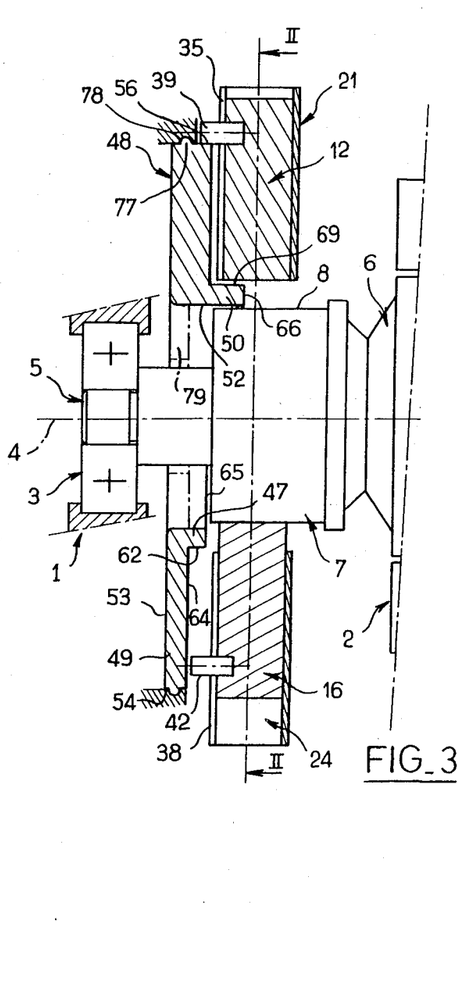
FIG. 3 is a section on the line III—III of FIG. 2.
Figure 8:
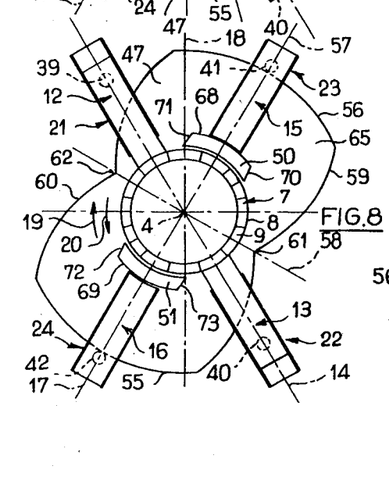
Figure 9:
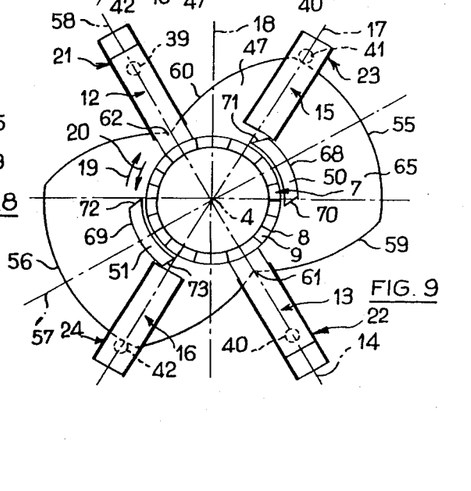

To reverse the direction of the motor from the direction of the arrow 20 in FIG. 2 to the direction of the arrow 19, the actuator 74 is moved through a limited arc in the direction of the arrow 19 in FIG. 2 to the position illustrated in FIG. 9. The various stages in this limited rotation of the cam member 48 are shown consecutively in FIGS. 4 through 9 which will now be described.

Figure 4:
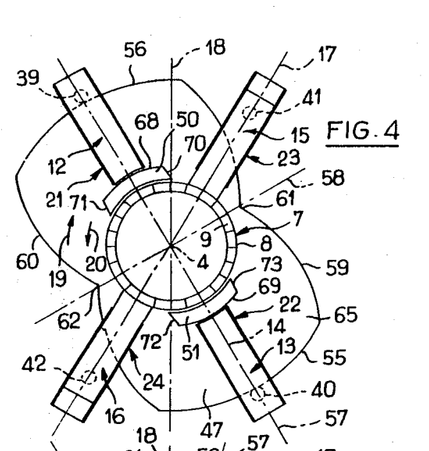
FIGS. 4 to 9 illustrate schematically in views corresponding to FIG. 2 positions of the brushes when being changed from the position in FIG. 2 to that in FIG. 9 in which the brushes are arranged for rotation of the armature in the opposite direction.

FIG. 4 illustrates a first stage in this rotation. The lugs 39, 40 of the brushes 12 and 13 remain in contact with the zones 56, 55, respectively, of the contour of the cam 47 so keeping the brushes 12, 13 at a distance from the commutator face 8 with the insulating segments 50, 51 inserted therebetween. During this first phase, the lugs 41, 42 continue to be respectively disengaged from the transverse zones 59, 60 of the contour of the cam 47, thus permitting the motor to rotate in the direction 20 through contact of the brushes 15 and 16 with the commutator segments 9.

Figure 5:
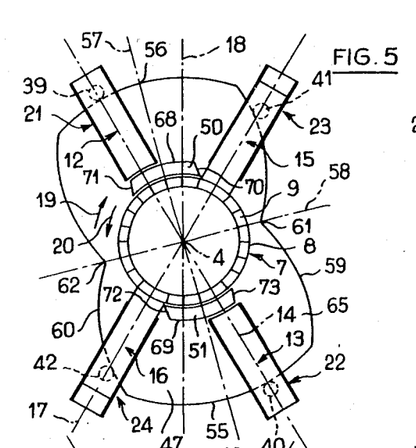

FIG. 5 illustrates the next phase in this angular shift. The contact between the lugs 39, 40 and, respectively, the cam zones 56, 55 is maintained, and the same holds true for the interposition of the insulating segments 50, 51 between the brushes 12, 13 and the commutator face 8. However, the lugs 41, 42 of the brushes 15, 16 come into respective contact with the cam zones 59, 60, and continuation of this rotation of the cam member 48 in the direction 19 starts to effect radial outward movement of the lugs 41, 42 causing the brushes 15, 16 to be lifted from the outer peripheral face 8 of the commutator 7.

Figure 6:
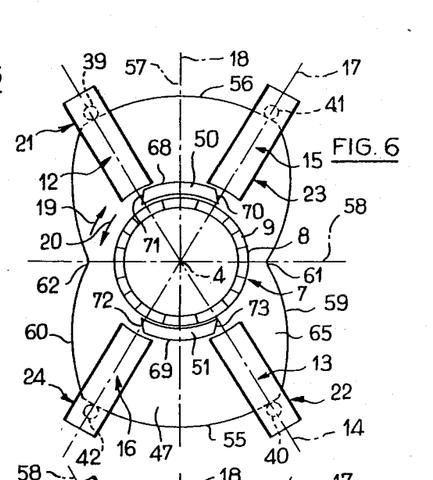

At the end of this phase, illustrated in FIG. 6, the planes 57 and 18 coincide, the lugs 39 and 41 are both in contact with the outer zone 56 of the cam 47, and the lugs 40 and 42 are both in contact with the area of the outer cam zone 55. The insulating segment 50 is now located between the commutator face 8 and both the brushes 12 and 15, and the segment 51 is now located between the face 8 and both the brushes 13, 16. In other words, the insulating segments 50, 51 become inserted between the previously active pair of brushes 15, 16 and the commutator 7 before allowing access of the previously inactive brushes 12, 13 to the latter.

Figure 7:
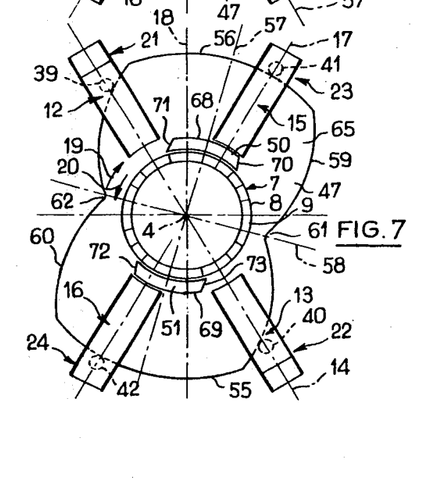

FIG. 7 illustrates the next phase in the angular shift of the cam part 48. The lugs 41, 42 continue to be in contact respectively with the cam zone 56, 55 thereby keeping the pair of brushes 15, 16 spaced away from the commutator face 8 from which they are still physically and electrically separated by the segments 50, 51. However, the lugs 39, 40 of the brushes 12, 13 start moving radially inwards now in contact with the transverse cam zones 60, 59. In the meantime the insulating segments 50, 51 have moved out of the path of the pair of brushes 12, 13 to allow free passage thereof toward the commutator 7 umder the bias of their respective springs.

Next, as shown in FIG. 8, with continued rotation of the cam member 48, contact is broken between the lugs 39, 40 and the contour of the cam 47, thereby releasing completely the pair of brushes 12, 13 to move fully inwards and bear against the commutator 7. Whereas the spacing of the other pair of brushes 15, 16 from the commutator is maintained by both the contact of the lugs 41, 42 with the outer cam zones 56, 55 and the interposition of the segments 50, 51.

As illustrated in FIG. 9 when, in the course of this movement, the plane 58 coincides with the mean axis 14 of the pair of brushes 12, 13, then the lugs 39, 40 are positioned facing the narrowings 62, 61, respectively, of the cam. The rotation of the cam member 48 is now completed and the brushes are now positioned for rotation of the armature 6 with respect to the stator 2 in the direction 19.

Another reversal in the direction of rotation of the armature 6 with respect to the stator 2 can be achieved by another manual actuation of the actuator 74, this time in the opposite direction to before, that is now in the direction 20, until the situation of FIG. 2 is again achieved. Preferably, the movement of the actuator 74 is limited in either direction by appropriate limit stops. When moving from the position in FIG. 9 back to that in FIG. 2, the intermediate stages moved through are successively those of FIGS. 8 through 4 in that order.

It will be appreciated that, even though it is preferred to open the switch 29 before undertaking an operation for reversal of the direction of rotation of the motor, such reversal operation if carried out with the switch 29 still closed would not cause the likelihood of an electric hazard such as short-circuiting. Further, even with the switch 29 closed, power is removed from the armature, and so in effect power to the motor is interrupted, during such reversal procedure because both pairs of brushes are momentarily removed from the commutator.

Figure 10:
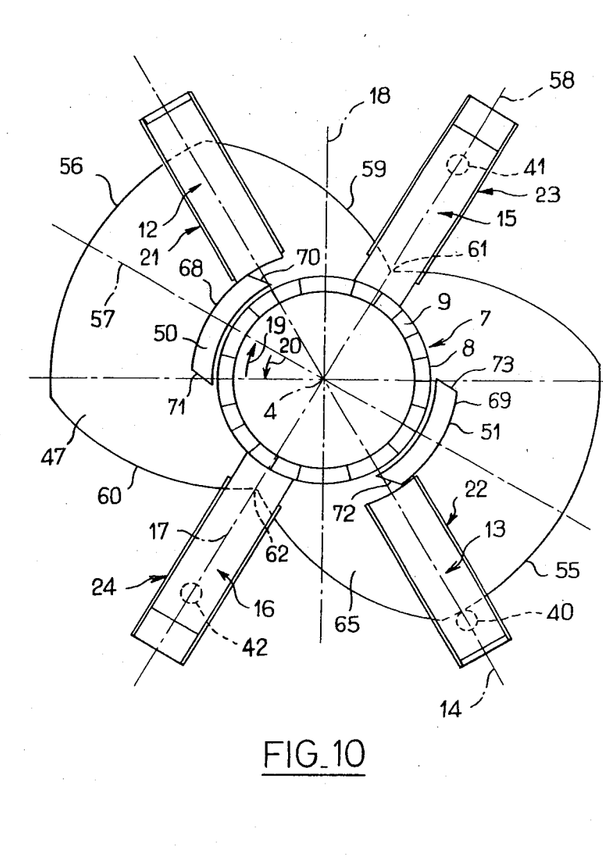
FIGS. 10 and 11 are further views similar to those of FIGS. 4 to 9 and illustrate how simultaneous accidental contacting of the commutator by the two pairs of brushes is prevented.
Figure 11:
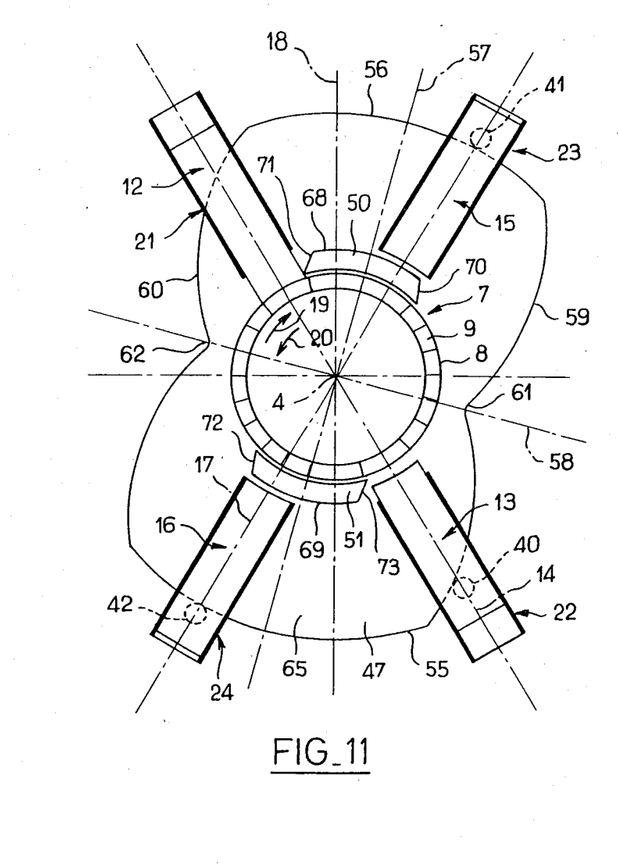

FIGS. 10 and 11 show the manner in which there are limited, owing to the segments 50 and 51, the possibilities of reversing the direction of rotation of the motor if the lug of one of the brushes, and for instance the lug 39 of the brush 12, happens to break or become detached, irrespective of whether that brush is or is not in operation. It will be appreciated that this is a further safety feature of the present invention.

Assuming the lug 39 of the brush 12 happens to detach itself while the motor is in the state illustrated in FIG. 2. Such a situation is illustrated in FIG. 10. Despite this break, the brush 12 continues to be separated from the commutator face 8 by the cylindrical segment 50, against which its spring 31 causes it to abut. The other brushes 13, 14 and 16 remain in the states described with reference to FIG. 2.

If the user then desires to reverse the direction of rotation of the motor, such user can readily go through the successive stages described with reference to FIGS. 4 to 9 by causing the cam member 48 to rotate in the direction 19 with respect to the housing 1. As soon as the segment 50 releases the brush 12 for passage towards the commutator 7, this occurring in an intermediate stage between that of FIGS. 6 and 7, the brush 12 slides in its guide 21 under the effect of the spring 31 and comes in to engagement with the commutator. This does not present any problem as the brushes 15 and 16 have already been lifted and separated from the commutator. Continuing rotation of the cam member 48 allows the brush 13 to likewise come in contact with the commutator. The motor can then operate as before in the direction 19 using the pair of brushes 12, 13.

If however, the user desires to reverse once again the direction of rotation of the motor, and tries to rotate the cam member 48 in the direction 20, the brush 13 will start to retract as before, but the brush 12 does not retract and the insulating segment 50 comes to abut against it. As shown in FIG. 11, the end face 71 of the segment 50 locks against the brush 12 before the brushes 15, 16 are able to commence their approach movement towards the commutator. The blocking action of the damaged brush 12 prevents further rotation of the cam member so that the lugs 41, 42 remain in contact with the zones 56, 55 and the arcuate segments 50, 51 remain inserted between the commutator and the brushes 15, 16. This also avoids any possibility of short-circuiting the commutator. The same non-reversal situation would have resulted if the break of the lug 39 of the brush 12 had occurred while the motor was in the state shown in FIG. 9, that is while set for rotation in the direction 19 using the brushes 12 and 13.

The above described brush arrangements make it possible not only to benefit from the electrical safety aspect, but also to provide a warning about the break of a brush lug as it becomes impossible to operate the actuator 74 to effect a reversal of the direction of rotation of the motor.

It will be appreciated that the mode of reversal of the direction of rotation of a motor as described above does not depend upon operation of the switch 29 to control the supply of electric power to the motor because a separate pair of brushes is associated with each specific direction of rotation of the motor, and the two pairs of brushes cannot be placed in contact with the commutator at the same time.

The above described embodiments, of course, are not to be construed as limiting the breadth of the present invention. Modifications, and other alternative constructions, will be apparent which are within the spirit and scope of the invention as defined in the appended claims.

What is claimed is:

1. An electric motor, comprising:
   a stator;
   an armature having a commutator, said armature being rotatable relative to said stator about an axis, said relative rotation being in either direction and determining the direction of rotation of the motor;
   means for selecting the direction of rotation of the motor;
   two pairs of brushes, one pair contacting said commutator in one direction of rotation of the motor, and the other pair being angularly displaced about said axis from said one pair and contacting said commutator in the opposite direction of rotation of the motor;
   means for moving said other pair of brushes out of contact with said commutator when said one direction of rotation is selected, and for moving said one pair of brushes out of contact with said commutator when said other direction of rotation is selected;
   said brush moving means comprising a cam rotatable about said axis;
   said brushes having projections which are engageable by said cam for moving the respective pairs of brushes away from said commutator; and
   said cam comprising two diametrically opposed lobes symmetrically disposed with respect to said axis.

2. The electric motor of claim 1, wherein said brushes are resiliently biased towards said commutator, and said selecting means is connected to and operates said brush moving means.

3. The electric motor of claim 1, wherein said motor is mounted in a housing, said cam is integral with an annular disc of electrically insulating material, and the periphery of said disc is rotatably supported by said housing.

4. The electric motor of claim 1, wherein one of each pair of brushes are electrically connected together, and the other of each pair of brushes are electrically connected together.

5. The electric motor of claim 4, wherein each brush is slidably mounted in a separate brush box, and the brush boxes of said one of each pair of brushes are mounted on and connected by a first member comprising electrically conductive material, and the brush boxes of said other of each pair of brushes are mounted on and connected by a second member comprising electrically conductive material spaced from and on the opposite side of said axis to said first member.

6. The electric motor of claim 5, further comprising means, connected to said brush moving means, for forming a barrier between said commutator and either pair of brushes when moved out of contact with said commutator.

7. An electric motor, comprising:
   a stator;
   an armature having a commutator, said armature being rotatable relative to said stator about an axis, said relative rotation being in either direction and determining the direction of rotation of the motor;
   means for selecting the direction of rotation of the motor;
   two pairs of brushes, one pair contacting said commutator in one direction of rotation of the motor, and the other pair being angularly displaced about said axis from said one pair and contacting said commutator in the opposite direction of rotation of the motor;
   means for moving said other pair of brushes out of contact with said commutator when said one direction of rotation is selected, and for moving said one pair of brushes out of contact with said commutator when said other direction of rotation is selected; and
   means, connected to said brush moving means, for forming a barrier between said commutator and either pair of brushes when moved out of contact with said commutator.

8. The electric motor of claim 7, wherein said barrier forming means comprises two electrically insulating arcuate segments coaxial with said axis and diametrically opposed with respect thereto.

9. The electric motor of claim 8, wherein said brush moving means comprises a cam rotatable about said axis, and said arcuate segments extend axially from said cam.

10. The electric motor of claim 9, wherein said armature has a shaft journalled at one end in a bearing disposed adjacent an end of said commutator, and said cam has a radially inwardly extending annular wall through which said shaft extends, said wall being of electrically insulating material and being interposed between said bearing and said end of said commutator.

11. The electric motor of claim 8, wherein each arcuate segment subtends at said axis an angle approximately equal to the angular displacement between said two pairs of brushes, whereby in an intermediate position of said brushes between their respective positions in either direction of rotation of the motor said arcuate segments are inserted between said commutator and both pairs of brushes.

12. The electric motor of claim 1, wherein said two pairs of brushes are symmetrically displaced on opposite sides of the mechanical neutral plane of said stator, each pair of brushes being disposed in the electric neutral plane of the stator for rotation of the motor in the direction in which that pair contacts the commutator.

13. An electric motor, comprising:
a stator;
an armature having a commutator, said armature being rotatable relative to said stator in either direction about an axis;
means for selecting the direction of rotation of the motor;
two pairs of brushes, one pair being resiliently biased to contact said commutator in one direction of rotation of the motor, and the other pair being angularly displaced about said axis with respect to said one pair and being resiliently biased to contact said commutator in the opposite direction of rotation of the motor;
said one pair of brushes being disposed in the electrical neutral plane of said stator in said one direction of rotation, and said other pair of brushes being disposed in the electrical neutral plane of said stator in said other direction of rotation;
a cam rotatable about said axis for moving said other pair of brushes out of contact with said commutator when said one direction of rotation is selected, and for moving said one pair of brushes out of contact with said commutator when said other direction of rotation is selected; and
a pair of segments of electrically insulating material extending axially from said cam on diametrically opposite sides of said axis, said pair of segments being interposed between a respective pair of brushes and said commutator when that pair of brushes has been moved out of contact with said commutator by said cam in accordance with the direction of rotation selected.

14. The electric motor of claim 13, wherein said brushes are each slidably mounted in a separate brush box of electrically conductive material, the brush box of one brush of each pair of brushes being mounted on a first common support member of electrically conductive material, the brush box of the other brush of each pair of brushes being mounted on a second common support member of electrically conductive material disposed on the opposite side of said axis to and spaced from said first common member, and a projection extends from each brush for engagement by said cam.

15. An electric motor, comprising:
a stator;
a rotor rotatable with respect to the stator around an axis in one direction or in the other as a function of a choice in the way the motor is supplied with electric current;
said rotor having a commutator;
said stator supporting two pairs of brushes, each pair occupying a mean diametrical position, the respective mean diametrical positions of the two pairs being angularly offset with respect to each other and fixed with respect to said stator to optimize functioning of the motor in each respective one of said directions of rotation;
selective means for radial application of the brushes of one pair or the other pair, exclusively, against the outer periphery of the commutator as a function of the said choice;
brush boxes supported by said stator for guiding the brushes during radial displacement thereof with respect to said commutator in said mean diametrical positions;
means for resiliently biasing each brush radially towards said commutator;
said selective means comprising a respective lug extending from each brush parallel to said axis, and a cam rotatably guided with respect and around said axis and being juxtaposed to the brushes adjacent said lugs;
said cam having an outer contour symmetrical with respect to said axis and of approximately figure 8-shape defined by two diametrically opposed narrowings and two diametrically opposed widenings of said contour; and
whereby when said widenings are disposed in line with one of said mean diametrical positions, said widenings act on the lugs of the brushes of the respective pair of brushes at that mean diametrical position for separating that pair of brushes from the outer periphery of said commutator, and said narrowings are then disposed in line with the other of said mean diametrical positions and release the lugs of the brushes of the other respective pair of brushes for application of the latter against the outer periphery of said commutator.

* * * * *